(12) United States Patent
Tokunaga et al.

(10) Patent No.: US 10,997,484 B2
(45) Date of Patent: May 4, 2021

(54) ANTENNA DEVICE AND COMMUNICATION TERMINAL APPARATUS

(71) Applicant: Murata Manufacturing Co., Ltd., Nagaokakyo (JP)

(72) Inventors: Tsuyoshi Tokunaga, Nagaokakyo (JP); Jian Wang, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 530 days.

(21) Appl. No.: 15/622,103

(22) Filed: Jun. 14, 2017

(65) Prior Publication Data

US 2017/0277990 A1 Sep. 28, 2017

Related U.S. Application Data

(63) Continuation of application No. PCT/JP2015/086170, filed on Dec. 25, 2015.

(30) Foreign Application Priority Data

Feb. 16, 2015 (JP) .............................. JP2015-028105

(51) Int. Cl.
*H01Q 1/24* (2006.01)
*G06K 19/077* (2006.01)
(Continued)

(52) U.S. Cl.
CPC ..... *G06K 19/07701* (2013.01); *G06K 19/077* (2013.01); *G06K 19/0723* (2013.01);
(Continued)

(58) Field of Classification Search
CPC ........... H01Q 7/00; H01Q 13/18; H01Q 13/10
(Continued)

(56) References Cited

U.S. PATENT DOCUMENTS 5,144,239 A * 9/1992 Oppelt ............. G01R 33/34076
324/318
5,177,441 A * 1/1993 Morich ................ G01R 33/385
324/309
(Continued)

FOREIGN PATENT DOCUMENTS

JP 03-202997 A 9/1991
JP 2003-093368 A 4/2003
(Continued)

OTHER PUBLICATIONS

Official Communication issued in International Patent Application No. PCT/JP2015/086170, dated Jan. 26, 2016.

*Primary Examiner* — Binh B Tran
(74) *Attorney, Agent, or Firm* — Keating & Bennett, LLP

(57) ABSTRACT

An antenna device includes a power feed coil and a ring-shaped conductor arranged about an axis and a ring-shaped conductor including first and second edge end portions in an axial direction and a cavity inward from the first edge end portion. At least a portion of the cavity overlaps with a coil opening of the power feed coil when seen from the radial direction. The power feed coil causes electric field coupling, magnetic field coupling, and/or electromagnetic field coupling with the cavity. The ring-shaped conductor defines and functions as a booster antenna of the power feed coil. A substantial coil opening defining and functioning as an antenna is larger than that when only the power feed coil is provided, thus facilitating coupling with a communication partner-side antenna coil.

20 Claims, 12 Drawing Sheets

(51) Int. Cl.
   *G06K 19/07*     (2006.01)
   *H01Q 7/08*      (2006.01)
   *H01Q 9/04*      (2006.01)
(52) U.S. Cl.
   CPC ... *G06K 19/0725* (2013.01); *G06K 19/07762* (2013.01); *H01Q 7/08* (2013.01); *H01Q 9/04* (2013.01)
(58) Field of Classification Search
   USPC ....... 343/702, 726, 728, 732, 741, 743, 744, 343/748, 769, 788, 700 MS, 866–868
   See application file for complete search history.

(56) References Cited

U.S. PATENT DOCUMENTS

| | | |
|---|---|---|
| 2011/0031320 A1 | 2/2011 | Kato et al. |
| 2012/0091821 A1 | 4/2012 | Kato et al. |

FOREIGN PATENT DOCUMENTS

| | | |
|---|---|---|
| JP | 2008-036350 A | 2/2008 |
| JP | 2008-187653 A | 8/2008 |
| JP | 2011-097657 A | 5/2011 |
| JP | 2011-249935 A | 12/2011 |
| JP | 2013-162195 A | 8/2013 |
| JP | 2015-093004 A | 5/2015 |
| WO | 2009/142114 A1 | 11/2009 |

\* cited by examiner

FIG. 11A
FIG. 11B
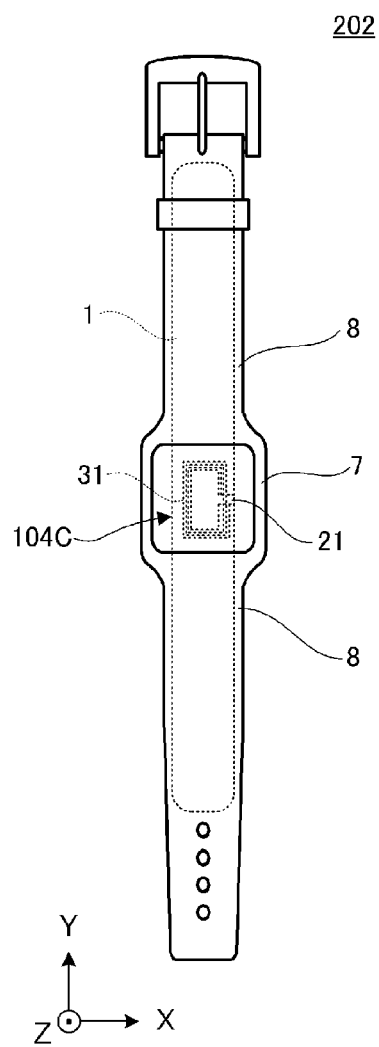
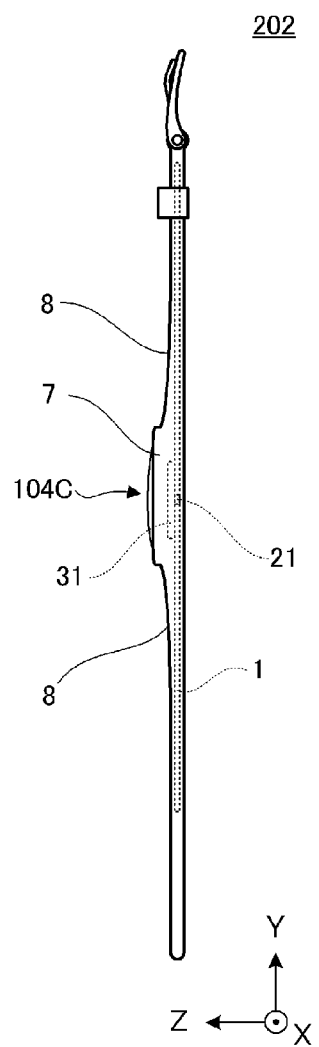

ANTENNA DEVICE AND COMMUNICATION TERMINAL APPARATUS

CROSS REFERENCE TO RELATED APPLICATIONS

This application claims the benefit of priority to Japanese Patent Application No. 2015-028105 filed on Feb. 16, 2015 and is a Continuation Application of PCT Application No. PCT/JP2015/086170 filed on Dec. 25, 2015. The entire contents of each application are hereby incorporated herein by reference.

BACKGROUND OF THE INVENTION

1. Field of the Invention

The present invention relates to an antenna device, and in particular, relates to an antenna device included in, for example, a wearable terminal. Furthermore, the present invention relates to a communication terminal apparatus, and in particular, relates to a communication terminal apparatus that is used as, for example, a wearable terminal.

2. Description of the Related Art

In recent years, various ring-shaped communication terminal apparatuses such as finger rings, arm rings, and wristwatches, which are directly wearable by a human, have been devised. The communication terminal apparatuses are so-called wearable terminals (Wearable Devices) and are information terminals that are not portable like smart phones and notebook computers and are used in a state of being attached to a human body.

For example, Japanese Unexamined Patent Application Publication No. 2008-187653 discloses a communication terminal apparatus including an integrated circuit, a wireless tag-side antenna, and a reader/writer-side antenna in a pedestal portion of a finger ring. Japanese Unexamined Patent Application Publication No. 3-202997 discloses a bracelet-type communication terminal apparatus that is connected to a control circuit in a main body and makes non-contact data communication with two sheet-shaped coils embedded in a belt. Japanese Unexamined Patent Application Publication No. 2003-93368 discloses a ring-type communication terminal apparatus that incorporates a linear conductor continuous in the circumferential direction in an arm and functions as an antenna.

However, in each of the configurations disclosed in Japanese Unexamined Patent Application Publication No. 2008-187653 and Japanese Unexamined Patent Application Publication No. 3-202997, an antenna coil is not formed in the overall small-sized communication terminal apparatus but is only formed in a portion of it and a coil opening of the antenna coil is therefore small. For this reason, a magnetic flux interlinking with a communication partner-side antenna coil is decreased and a communicable distance in a communication system is short. Furthermore, in the configuration disclosed in Japanese Unexamined Patent Application Publication No. 2003-93368, the linear conductor functioning as the antenna is incorporated in the arm of the ring by winding it in the circumferential direction to increase the thickness of the communication terminal apparatus. Moreover, when the arm of the ring, which incorporates therein the linear conductor, is made of metal, the arm made of metal shields a magnetic field, resulting in significant lowering in antenna characteristics.

SUMMARY OF THE INVENTION

Preferred embodiments of the present invention provide ring-shaped antenna devices with excellent communication characteristics and a simple configuration without using a large-sized antenna coil, and communication terminal apparatuses including the antenna devices.

An antenna device according to a preferred embodiment of the present invention includes a power feed coil; and a ring-shaped conductor arranged about an axis and including a first edge end portion and a second edge end portion in an axial direction. The ring-shaped conductor includes a cavity extending inward from the first edge end portion with at least a portion of the cavity overlapping with a coil opening of the power feed coil when seen from a radial direction. The power feed coil generates electric field coupling, magnetic field coupling, and/or electromagnetic field coupling with the cavity.

With this configuration, the power feed coil described above generates electric field coupling, magnetic field coupling, and/or electromagnetic field coupling with the cavity of the ring-shaped conductor. Therefore, the ring-shaped conductor defines and functions as a booster antenna of the power feed coil. A substantial coil opening defining and functioning as an antenna is larger than that when only the power feed coil is provided and a range and a distance in which a magnetic flux is radiated (collected) are increased. This enables coupling with a communication partner-side antenna coil to become easier. Accordingly, the ring-shaped antenna device excellent in communication characteristics is able to be provided with a simple configuration without using a large-sized antenna coil.

A cavity according to preferred embodiment of the present invention includes a wide portion with a width in a circumferential direction at a position that is not adjacent to the first edge end portion or the second edge end portion which is wider than other portions of the cavity, and the power feed coil generate electric field coupling, magnetic field coupling, and/or electromagnetic field coupling with the wide portion. Therefore, the magnetic flux that is generated from the power feed coil and passes through the cavity is increased and the degree of coupling between the power feed coil and the ring-shaped conductor is enhanced. Furthermore, the cavity enlarges a region in which the power feed coil and the second edge end portion of the ring-shaped conductor are close to each other, thus enhancing the degree of coupling between the power feed coil and the ring-shaped conductor. The degree of coupling between the booster antenna and the power feed coil is preferably enhanced as high as possible because it influences the amount of electromagnetic energy that a power feed circuit is able to receive with the booster antenna interposed therebetween. Accordingly, this configuration is able to provide excellent communication characteristics as a result.

A cavity according to a preferred embodiment of the present invention is able to connect the first edge end portion and the second edge end portion.

An antenna device according to a preferred embodiment of the present invention may further include a cavity connecting the first edge end portion and the second edge end portion in addition to the cavity generating electric field coupling, magnetic field coupling, and/or electromagnetic field coupling with the power feed coil. With this configuration, the degree of freedom in design of the ring-shaped conductor is enhanced.

In an antenna device according to a preferred embodiment of the present invention, it is preferable that the second edge end portion of the ring-shaped conductor is continuous in a circumferential direction. With this configuration, an induced current flows through the first edge end portion of the ring-shaped conductor by electric field coupling, magnetic field coupling, and/or electromagnetic field coupling between the power feed coil and the cavity of the ring-shaped conductor. Furthermore, an induced current also flows through the second edge end portion of the ring-shaped conductor by magnetic field coupling with the power feed coil. The direction of the induced current flowing through the first edge end portion and the direction of the induced current flowing through the second edge end portion are the same. Accordingly, not only the surface of the ring-shaped conductor in the radial direction but also the first edge end portion and the second edge end portion define and function as the antenna to increase the area of the substantial coil opening through which the magnetic flux enters and leaves and increase the range and the distance in which the magnetic flux is radiated (collected). This enables coupling with the communication partner-side antenna coil to become easier. Accordingly, the antenna device excellent in the communication characteristics is able to be provided.

A communication terminal apparatus according to a preferred embodiment of the present invention includes an antenna device according to a preferred embodiment of the present invention described above and a power feed circuit that is connected to the power feed coil or generates electric field coupling, magnetic field coupling, and/or electromagnetic field coupling with the power feed coil. With this configuration, the communication terminal apparatus including the antenna device, which is used for a communication system of a HF band and a UHF band, is able to be provided.

In a communication terminal apparatus according to a preferred embodiment of the present invention, it is preferable that the ring-shaped conductor be provided in an attachment portion through which a portion of a human body is inserted. With this configuration, the communication terminal apparatus including the antenna device, which is preferably used in the communication system of the HF band and the UHF band, can be provided as a so-called wearable terminal. Furthermore, skin (epidermis) of the human body is able to be substantially regarded as an insulating body and a subcutaneous portion thereof is able to be substantially regarded as a conductor. Therefore, a magnetic flux generated from the communication partner-side antenna coil enters and leaves (interlinks with) the first edge end portion and the second edge end portion while drawing a large loop of the magnetic flux along the human body inserted through the ring-shaped conductor. In this manner, a magnetic path is changed with the human body inserted through the ring-shaped conductor and the magnetic flux generated from the communication partner-side antenna coil becomes easy to interlink with the ring-shaped conductor. Accordingly, the human body also functions as a booster and radiation and collection of the magnetic flux are performed efficiently, thus enhancing magnetic field coupling with the communication partner-side antenna coil. As a result, excellent communication characteristics are achieved.

Preferred embodiments of the present invention provide ring-shaped antenna devices excellent in communication characteristics with a simple configuration without using a large-sized antenna coil and communication terminals apparatus including the antenna devices.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11A is a plan view of a communication terminal apparatus 202 according to a sixth preferred embodiment of the present invention and FIG. 11B is a right side view of the communication terminal apparatus 202.

DETAILED DESCRIPTION OF THE PREFERRED EMBODIMENTS

Figure 1A:
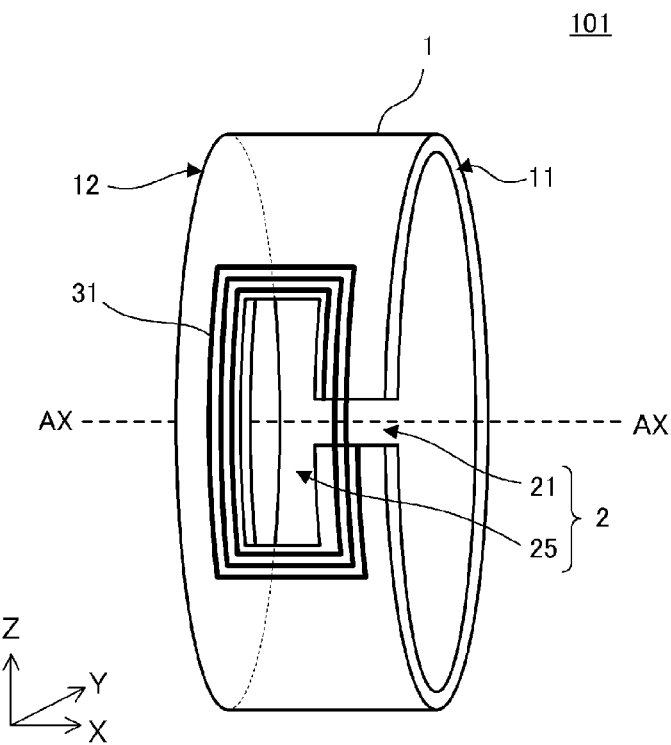
FIG. 1A is an outer appearance perspective view of an antenna device 101 according to a first preferred embodiment of the present invention and FIG. 1B is a plan view of a conductor pattern of a power feed coil 31 included in the antenna device 101.

Hereinafter, preferred embodiments of the present invention will be described using several specific examples with reference to the drawings. The same reference numerals denote the same sites in the respective drawings. The respective preferred embodiments are examples and partial replacement or combination of components that are described in different preferred embodiments can be made.

In the following respective preferred embodiments, an "antenna device" is an antenna that radiates a magnetic flux. The antenna device is preferably an antenna that is used in communication in a neighborhood field utilizing magnetic field coupling with a communication partner-side antenna and is used is communications such as, for example, near field communication (NFC). The antenna device is preferably used in a communication frequency band of, for example, a HF band, and particularly, in a frequency of around 13.56 MHz.

First Preferred Embodiment

Figure 1B:
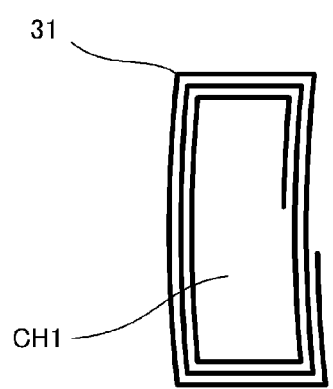
Figure 2A:
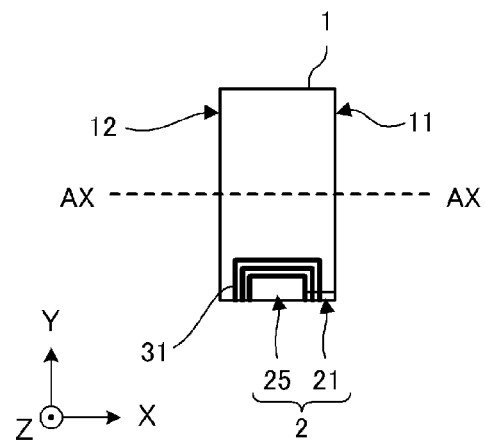
FIG. 2A is a plan view of the antenna device 101.
Figure 2B:
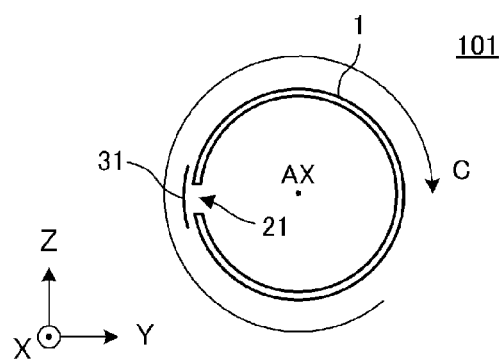
FIG. 2B is a right side view of the antenna device 101.
Figure 2C:
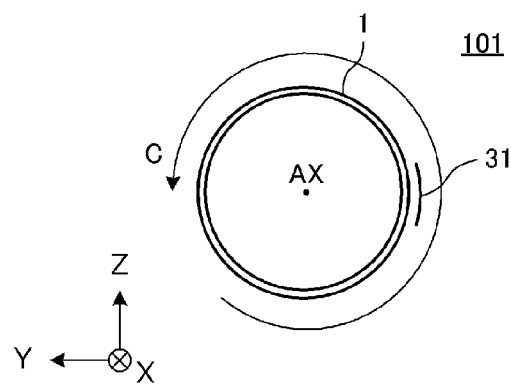
FIG. 2C is a left side view of the antenna device 101.

FIG. 1A is an outer appearance perspective view of an antenna device 101 according to a first preferred embodiment of the present invention and FIG. 1B is a plan view of a conductor pattern of a power feed coil 31 included in the antenna device 101. FIG. 2A is a plan view of the antenna device 101, FIG. 2B is a right side view of the antenna device 101, and FIG. 2C is a left side view of the antenna device 101. FIG. 1 and FIG. 2 illustrate the configuration of the antenna device 101 in a simplified manner to make the drawings and the principle more clear.

The antenna device 101 preferably includes a ring-shaped conductor 1 and a power feed coil 31.

The ring-shaped conductor 1 is a conductor preferably with a ring shape, which is arranged about an axis AX, and includes a first edge end portion 11 and a second edge end portion 12 that are perpendicular or substantially perpendicular to an axial direction (X direction in FIG. 2A). The ring-shaped conductor 1 includes a cavity 2 recessed inward (to the left side in FIG. 1 and FIG. 2A) from the first edge end portion 11. In the present preferred embodiment, the ring-shaped conductor 1 is curved about the axis AX and is an example of the ring-shaped conductor that is "arranged about an axis".

The cavity 2 in the present preferred embodiment includes a slit portion 21 that is provided inward from the first edge end portion 11 and a wide portion 25. The wide portion 25 is provided at a position that is not adjacent to the first edge end portion 11 or the second edge end portion 12 and has a relatively larger width (length in a C direction in FIG. 2B and FIG. 2C) in a circumferential direction (C direction in FIG. 2B and FIG. 2C) than the slit portion 21. As illustrated in FIG. 2C, the second edge end portion 12 of the ring-shaped conductor 1 is continuous in the circumferential direction.

The power feed coil 31 is defined by a spiral-shaped conductor pattern and both of end portions thereof are connected to a power feed circuit (not illustrated). The power feed coil 31 in the present preferred embodiment is in an outer side portion (in a front side portion in FIG. 1) of the ring-shaped conductor in the radial direction (direction of being farther from the axis AX in FIG. 2B and FIG. 2C). The power feed coil 31 is preferably, for example, Cu foil, and is provided on a main surface of a sheet made of resin such as polyimide (PI) and liquid crystal polymer (LCP).

As illustrated in FIG. 1A, the wide portion 25 in the present preferred embodiment preferably overlaps with a coil opening CH1 of the power feed coil 31 when seen from the radial direction.

Figure 3A:
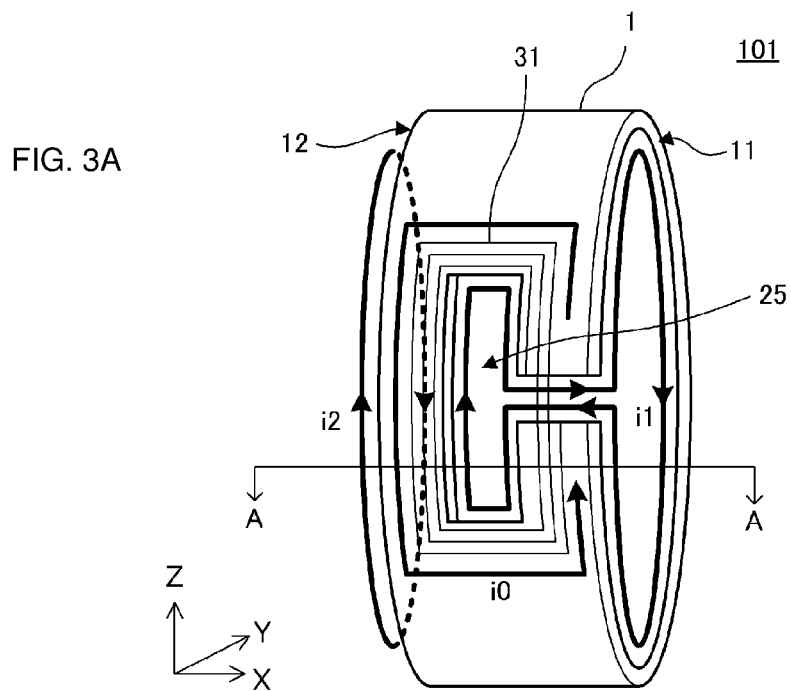
FIG. 3A is an outer appearance perspective view of the antenna device 101, which illustrates a relationship between a current flowing through the power feed coil 31 and currents that are generated in a ring-shaped conductor 1.
Figure 3B:
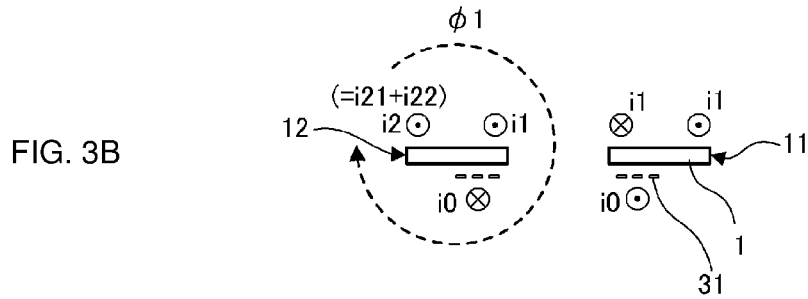
FIG. 3B is a cross-sectional view cut along line A-A in FIG. 3A.
Figure 3C:
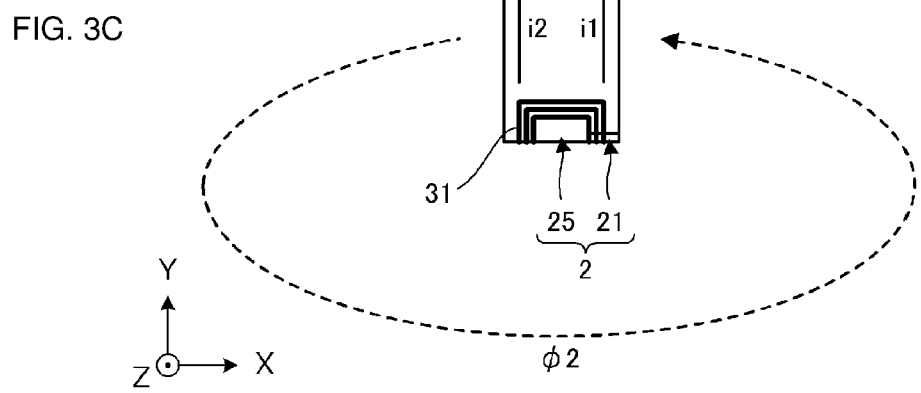
FIG. 3C is a plan view of the antenna device 101, which illustrates a relationship between the currents that are generated in the ring-shaped conductor 1 and a magnetic flux.

FIG. 3A is an outer appearance perspective view of the antenna device 101, which illustrates a relationship between a current flowing through the power feed coil 31 and currents that are generated in the ring-shaped conductor 1, FIG. 3B is a cross-sectional view cut along line A-A in FIG. 3A, and FIG. 3C is a plan view of the antenna device 101, which illustrates a relationship between the currents that are generated in the ring-shaped conductor 1 and a magnetic flux.

As illustrated in FIG. 3A, when a current i0 flows through the power feed coil 31, the current i0 induces a current i1 through electric field coupling, magnetic field coupling, and/or electromagnetic field coupling in the wide portion 25 of the ring-shaped conductor 1. That is to say, the current i0 causes the current i1 in a direction of cancelling the current i0 (clockwise direction in FIG. 3A) to be generated in the wide portion 25 in a portion in which the power feed coil 31 and the ring-shaped conductor 1 are close to each other. In this case, a current density in the edge end of the wide portion 25 of the ring-shaped conductor 1 is high based on the edge effect. The wide portion 25 faces the first edge end portion 11 of the ring-shaped conductor 1 with the slit portion 21 interposed therebetween. Therefore, the current i1 induced in the wide portion 25 flows through the first edge end portion 11 after passing through the edge end of the slit portion 21 based on the edge effect.

Furthermore, the current i0 flowing through the power feed coil 31 induces a current i2 through electric field coupling, magnetic field coupling, and/or electromagnetic field coupling in the second edge end portion 12 of the ring-shaped conductor 1.

That is to say, the current i0 causes a current i21 in a direction of cancelling the current i0 (clockwise direction in FIG. 3A) to be generated by electric field coupling in the second edge end portion 12 in a portion in which the power feed coil 31 and the ring-shaped conductor 1 are close to each other. In addition, the current i0 flowing through the power feed coil 31 generates a magnetic flux φ1. The magnetic flux φ1 is a magnetic flux that comes around a lower portion (lower side in FIG. 3B) of the ring-shaped conductor 1 after passing through an upper portion (upper side in FIG. 3B) of the ring-shaped conductor 1. A current i22 in a direction of cancelling the magnetic flux φ1 (direction toward the back side from the front side in FIG. 3B) is generated by magnetic field coupling in the second edge end portion. In this case, a current density in the second edge end portion 12 of the ring-shaped conductor 1 is high based on the edge effect.

The currents i21 and i22 that are generated in the second edge end portion 12 have the same phase and both of them are superimposed (added) on (to) each other. Therefore, the current i2 (i21+i22) is generated in the second edge end portion 12. When the second edge end portion 12 is not close to the power feed coil 31, the current i21 that is generated in the second edge end portion 12 by electric field coupling is decreased. In this case, the current i2 that is generated in the second edge end portion 12 becomes a current mainly by magnetic field coupling.

As described above, the power feed coil 31 is coupled to the ring-shaped conductor 1 with an electric field, a magnetic field, or an electromagnetic field formed therebetween. Therefore, the ring-shaped conductor 1 defines and functions as a booster antenna of the power feed coil 31.

Although actions when the antenna device 101 is the transmission-side antenna have been explained in the above-described example, the actions are also established even when transmission and reception sides are reversed based on the reciprocity theorem of the antenna. That is to say, the same actions are provided when the antenna device 101 is a reception-side antenna.

In this preferred embodiment, the power feed coil 31 causes electric field coupling, magnetic field coupling, and/or electromagnetic field coupling with the cavity 2 of the ring-shaped conductor 1 and the ring-shaped conductor 1 therefore defines and functions as the booster antenna of the power feed coil 31. With this function, a substantial coil opening defining and functioning as an antenna is larger than that when only the power feed coil 31 is provided and a range and a distance in which the magnetic flux is radiated (collected) are increased. This enables coupling with a communication partner-side antenna coil to become easier. Accordingly, the ring-shaped antenna device excellent in communication characteristics is able to be provided with a simple configuration without using a large-sized antenna coil.

In the present preferred embodiment, the cavity 2 includes the wide portion 25 with the relatively large width in the circumferential direction and the power feed coil 31 generates electric field coupling, magnetic field coupling, and/or electromagnetic field coupling with the wide portion 25. With this configuration, the magnetic flux that is generated from the power feed coil 31 and passes through the cavity 2 is increased and the degree of coupling between the power feed coil 31 and the ring-shaped conductor 1 is enhanced. Furthermore, provision of the cavity 2 enlarges a region in which the power feed coil 31 and the second edge end portion 12 of the ring-shaped conductor 1 are close to each other, thus enhancing the degree of coupling between the power feed coil 31 and the ring-shaped conductor 1. The degree of coupling between the booster antenna and the power feed coil 31 is preferably enhanced as high as possible because it influences the amount of electromagnetic energy that the power feed circuit is able to receive with the booster antenna interposed therebetween. Accordingly, this configuration provides excellent communication characteristics as a result.

The second edge end portion 12 of the ring-shaped conductor 1 in the present preferred embodiment is preferably continuous in the circumferential direction. With this configuration, when the power feed coil 31 generates electric field coupling, magnetic field coupling, and/or electromagnetic field coupling with the cavity 2 of the ring-shaped conductor 1, the direction of the current i1 flowing through the first edge end portion 11 and the direction of the current i2 flowing through the second edge end portion 12 are the same (see FIG. 3A). Therefore, a magnetic flux φ2 passing through the curved ring-shaped conductor 1 in the axial direction is generated as illustrated in FIG. 3C. In this manner, the first edge end portion 11 and the second edge end portion 12 define and function as the antenna to increase the area of the substantial coil opening through which the magnetic flux enters and leaves and increase the range and the distance in which the magnetic flux is radiated (collected). This enables coupling with the communication partner-side antenna coil to become easier. Accordingly, the antenna device excellent in the communication characteristics is able to be provided.

Next, effects when the antenna device 101 is included in a communication terminal apparatus as a so-called wearable terminal will be described.

Figure 4:
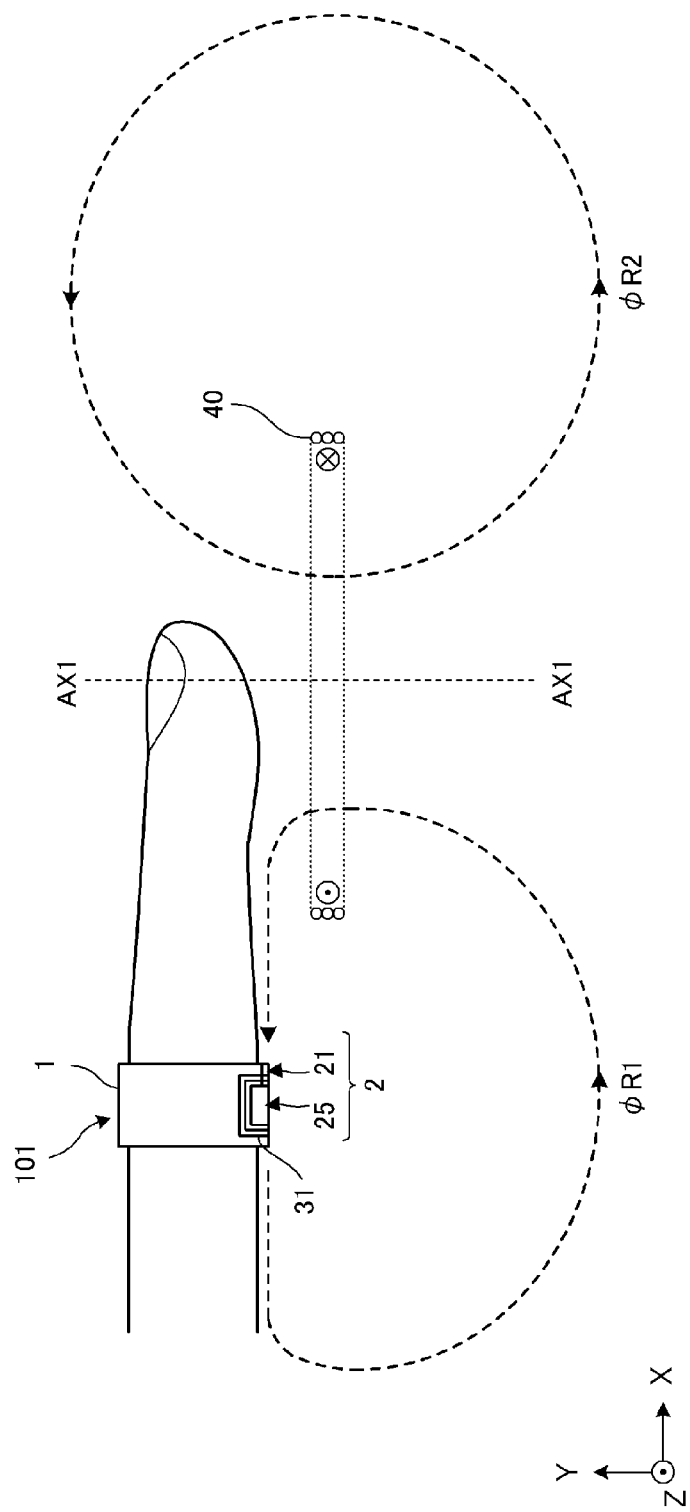
FIG. 4 is a conceptual view illustrating states of magnetic fluxes φR1 and φR2 that are generated from a communication partner-side antenna coil 40 close to the antenna device 101 when the antenna device 101 is attached to a portion of a human body.

FIG. 4 is a conceptual view illustrating states of magnetic fluxes φR1 and φR2 that are generated from a communication partner-side antenna coil 40 which is close to the antenna device 101 when the antenna device 101 is attached to a portion of a human body. FIG. 4 illustrates the configuration of the antenna device 101 in a simplified manner.

The antenna device 101 is provided in an attachment portion through which a portion of the human body is inserted. The above-described attachment portion is, for example, a finger ring or the like. Therefore, as illustrated in FIG. 4, a finger (a portion of the human body) is inserted through the ring-shaped conductor 1 of the antenna device 101. With this configuration, a communication terminal apparatus including the antenna device 101, which is used for a communication system of a HF band and a UHF band, is able to be provided as a so-called wearable terminal.

The antenna device 101 through which the finger 3 is inserted is close to the communication partner-side antenna coil 40. As illustrated in FIG. 4, the communication partner-side antenna coil 40 includes a winding axis AX1 in the Y direction. Furthermore, the communication partner-side antenna coil 40 is connected to a power feed circuit (not illustrated) and the magnetic fluxes φR1 and φR2 are generated when a current flows therethrough.

Skin (epidermis) of the human body can be regarded as an insulating body and a subcutaneous portion thereof can be regarded as a conductor. Therefore, as illustrated in FIG. 4, the magnetic flux φR1 generated from the communication partner-side antenna coil 40 enters and leaves (interlinks with) the first edge end portion 11 and the second edge end portion 12 while drawing a large loop of the magnetic flux along the human body inserted through the ring-shaped conductor 1. In this manner, a magnetic path is changed with the human body inserted through the ring-shaped conductor and the magnetic flux generated from the communication partner-side antenna coil becomes easy to interlink with the ring-shaped conductor. Accordingly, the human body also functions as a booster and radiation and collection of the magnetic flux are performed efficiently, thus enhancing the magnetic field coupling with the communication partner-side antenna coil 40. As a result, excellent communication characteristics are achieved.

Although in the antenna device 101 in the present preferred embodiment, the shape of the wide portion 25 is preferably rectangular or substantially rectangular when seen from the radial direction, as an example, the antenna device 101 is not limited to this configuration. The shape of the wide portion 25 can be appropriately changed to a circular shape, an elliptical shape, a polygonal shape, or the like when seen from the radial direction.

Although in the antenna device 101 in the present preferred embodiment, the power feed coil 31 is provided as a rectangular spiral-shaped conductor pattern when seen from the radial direction, as an example, the antenna device 101 is not limited to this configuration. The shape of the power feed coil 31 can be appropriately changed to a circular shape, an elliptical shape, a polygonal shape, or the like when seen from the radial direction. It should be noted that in this case, the wide portion 25 preferably overlaps with the coil opening CH1 of the power feed coil 31 when seen from the radial direction in order to enhance the degree of coupling between the power feed coil 31 and the ring-shaped conductor 1.

Although in the antenna device 101 in the present preferred embodiment, the wide portion 25 preferably overlaps with the coil opening CH1 of the power feed coil 31 when seen from the radial direction, the antenna device 101 is not limited to this configuration. It is sufficient that at least a portion of the wide portion 25 overlaps with the coil opening CH1 of the power feed coil 31 when seen from the radial direction. The arrangement of the power feed coil 31 can be appropriately changed in a range in which it has the function of causing electric field coupling, magnetic field coupling, and/or electromagnetic field coupling with the wide portion 25.

Second Preferred Embodiment

Figure 5:
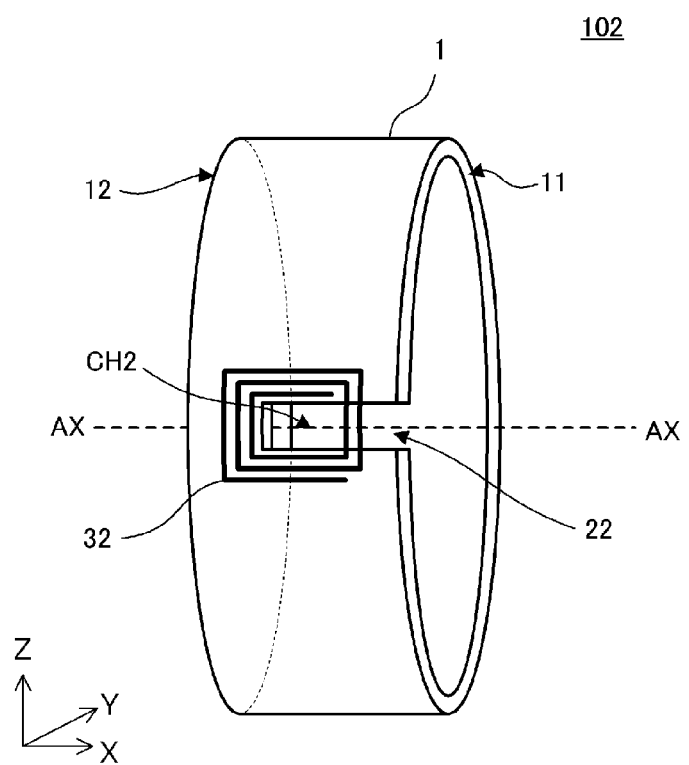
FIG. 5 is an outer appearance perspective view of an antenna device 102 according to a second preferred embodiment of the present invention.

FIG. 5 is an outer appearance perspective view of an antenna device 102 according to a second preferred embodiment of the present invention. FIG. 5 illustrates the structure of the antenna device 102 in a simplified manner.

The antenna device 102 in the second preferred embodiment is different from the antenna device 101 in the first preferred embodiment in a point that a cavity has no wide portion and has a single constant width, that is, in a shape of a power feed coil when seen from the radial direction. Other configurations thereof are preferably the same or substantially the same as those of the antenna device 101 in the first preferred embodiment.

Hereinafter, elements of the antenna device 102, which are different from the antenna device 101 in the first preferred embodiment, will be described.

As illustrated in FIG. 5, the cavity in the antenna device 102 does not include a wide portion and instead includes only a slit portion 22 that is inward from the first edge end portion 11. Furthermore, the antenna device 102 preferably includes a power feed coil 32. The slit portion 22 in the present preferred embodiment overlaps with a coil opening CH2 of the power feed coil 32 when seen from the radial direction.

Even with this configuration, the antenna device 102 preferably has the basic configuration that is the same or substantially the same as that of the antenna device 101 in the first preferred embodiment and provides the same actions and effects as those provided by the antenna device 101.

Although in the present preferred embodiment, the slit portion 22 preferably has the rectangular shape elongated inward from the first edge end portion 11 when seen from the radial direction, as an example, the slit portion 22 is not limited to this configuration. The shape of the slit portion 22 can be appropriately changed to a circular shape, an elliptical shape, a polygonal shape, or the like when seen from the radial direction. It should be noted that in this case, the slit portion 22 preferably overlaps with the coil opening CH2 of the power feed coil 31 when seen from the radial direction in order to enhance the degree of coupling between the power feed coil 31 and the ring-shaped conductor 1.

Third Preferred Embodiment

Figure 6:
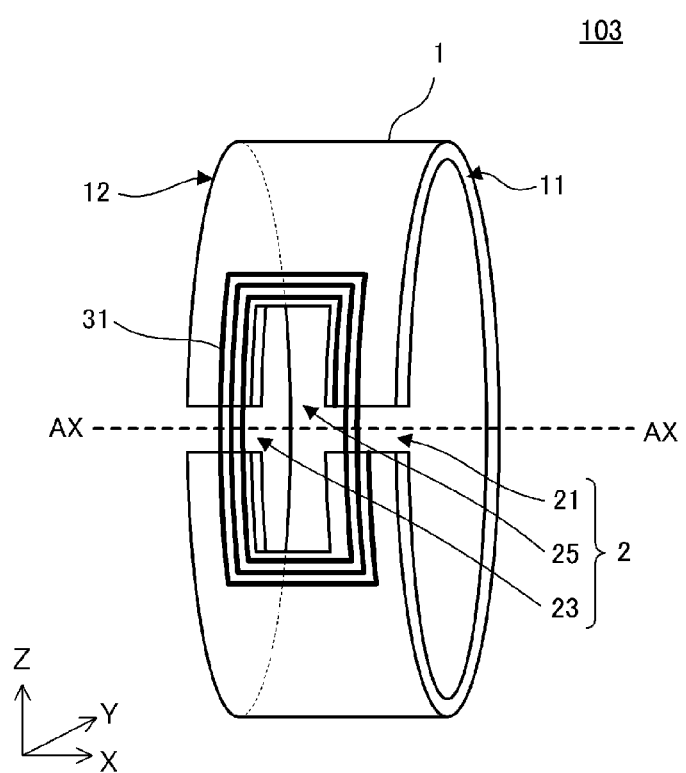
FIG. 6 is an outer appearance perspective view of an antenna device 103 according to a third preferred embodiment of the present invention.

FIG. 6 is an outer appearance perspective view of an antenna device 103 according to a third preferred embodiment of the present invention. FIG. 6 illustrates the configuration of the antenna device 103 in a simplified manner.

The antenna device 103 in the third preferred embodiment is different from the antenna device 101 in the first preferred embodiment in a point that the antenna device 103 further includes a slit portion 23. Other configurations thereof preferably are the same or substantially the same as those of the antenna device 101 in the first preferred embodiment.

Hereinafter, elements of the antenna device 103, which are different from the antenna device 101 in the first preferred embodiment, will be described.

A cavity in the antenna device 103 preferably includes the slit portion 23 inward (to the right side in FIG. 6) from the second edge end portion 12 in addition to the slit portion 21 and the wide portion 25. As illustrated in FIG. 6, the cavity in the antenna device 103 connects the first edge end portion 11 and the second edge end portion 12.

Figure 7A:
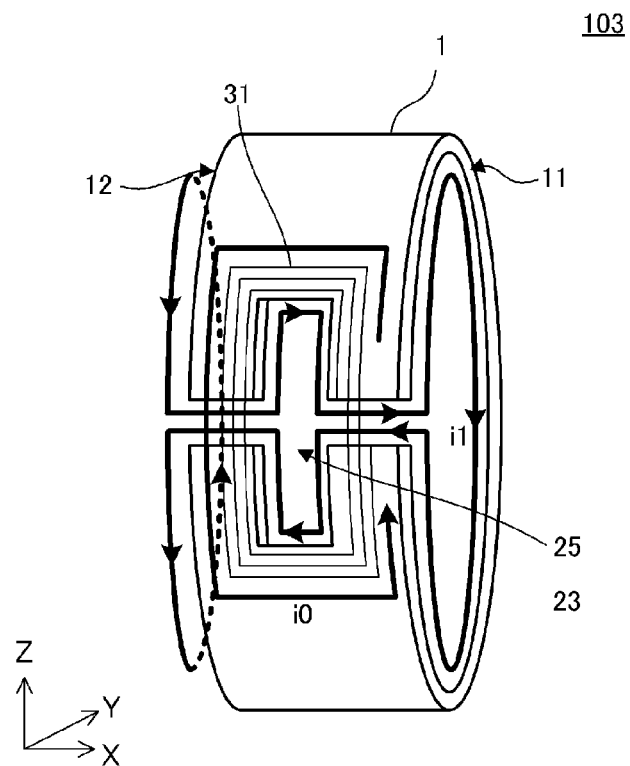
FIG. 7A is an outer appearance perspective view of the antenna device 103, which illustrates a relationship between a current flowing through the power feed coil 31 and a current that is generated in the ring-shaped conductor 1
Figure 7B:
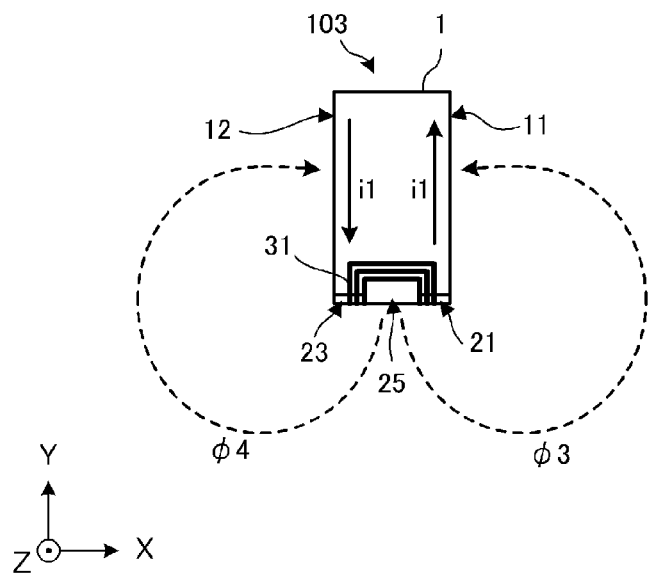
FIG. 7B is a plan view of the antenna device 103, which illustrates a relationship between the current that is generated in the ring-shaped conductor 1 and magnetic fluxes.

FIG. 7A is an outer appearance perspective view of the antenna device 103, which illustrates a relationship between a current flowing through the power feed coil 31 and a current that is generated in the ring-shaped conductor 1, and FIG. 7B is a plan view of the antenna device 103, which illustrates a relationship between the current that is generated in the ring-shaped conductor 1 and magnetic fluxes.

As illustrated in FIG. 7A, when a current i0 flows through the power feed coil 31, the current i0 induces a current i1 by electric field coupling, magnetic field coupling, and/or electromagnetic field coupling in the wide portion 25 of the ring-shaped conductor 1. That is to say, the current i0 causes the current i1 in a direction of cancelling the current i0 (clockwise direction in FIG. 7A) to be generated in the wide portion 25 in a portion in which the power feed coil 31 and the ring-shaped conductor 1 are close to each other. In this case, a current density in the edge end of the wide portion 25 of the ring-shaped conductor 1 is high based on the edge effect. The wide portion 25 faces the first edge end portion 11 of the ring-shaped conductor 1 with the slit portion 21 interposed therebetween. Therefore, the current i1 induced in the wide portion 25 flows through the first edge end portion 11 after passing through the edge end of the slit portion 21 based on the edge effect. Furthermore, the wide portion 25 faces the second edge end portion 12 of the ring-shaped conductor 1 with the slit portion 23 interposed therebetween. Therefore, the current i1 induced in the wide portion 25 flows through the second edge end portion 12 after passing through the slit portion 23 based on the edge effect.

As described above, the power feed coil 31 is coupled to the ring-shaped conductor 1 with an electric field, a magnetic field, or an electromagnetic field generated therebetween and the ring-shaped conductor 1 therefore defines and functions as a booster antenna of the power feed coil 31. With this function, a substantial coil opening defining and functioning as an antenna is larger than that when only the power feed coil 31 is provided. This enables coupling with a communication partner-side antenna coil to become easier.

It should be noted that in the present preferred embodiment, the direction of the current i1 flowing through the first edge end portion 11 and the direction of the current i1 flowing through the second edge end portion 12 are reversed to each other (see FIG. 7B and the like). Therefore, as illustrated in FIG. 7B, magnetic fluxes φ3 and φ4 that pass through the first edge end portion 11 and the second edge end portion 12, respectively, of the ring-shaped conductor 1 from the cavity 25 are generated. Accordingly, the configuration in which the cavity connects the first edge end portion 11 and the second edge end portion 12 provides the antenna device 103 with an antenna directivity that is different from the antenna device 101.

Although the cavity has the wide portion 25, as an example, in the present preferred embodiment, the cavity is not limited to this configuration. For example, only the slit portion may connect the first edge end portion 11 and the second edge end portion 12.

Fourth Preferred Embodiment

Figure 8A:
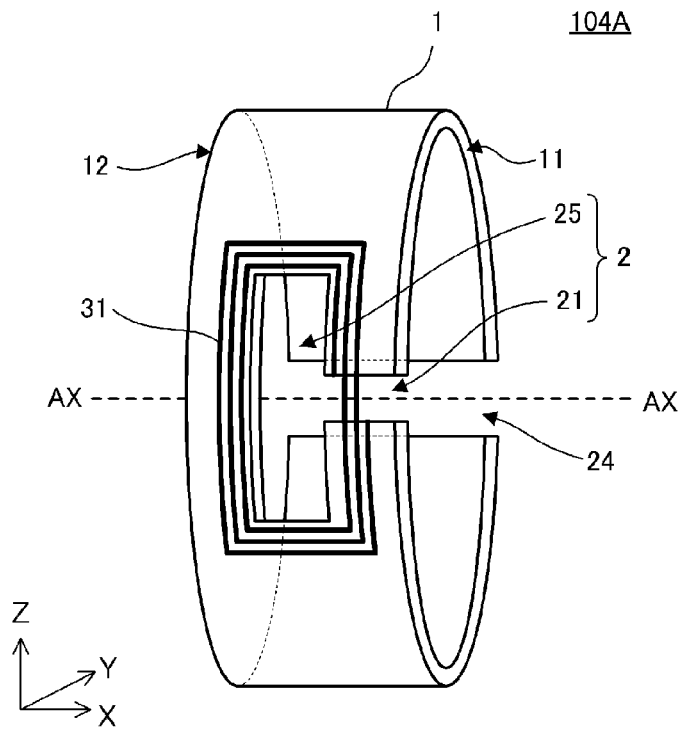
FIG. 8A is an outer appearance perspective view of an antenna device 104A according to a fourth preferred embodiment of the present invention and FIG. 8B is an outer appearance perspective view of the antenna device 104A, which illustrates a relationship between a current flowing through the power feed coil 31 and currents that are generated in the ring-shaped conductor 1.
Figure 8B:
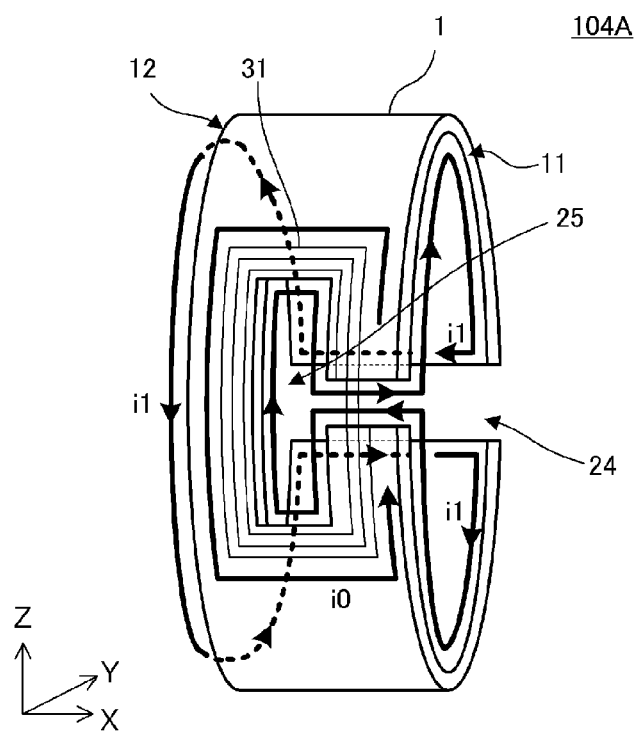

FIG. 8A is an outer appearance perspective view of an antenna device 104A according to a fourth preferred embodiment of the present invention, and FIG. 8B is an outer appearance perspective view of the antenna device 104A, which illustrates a relationship between a current flowing through the power feed coil 31 and a current that is generated in the ring-shaped conductor 1.

Figure 9A:
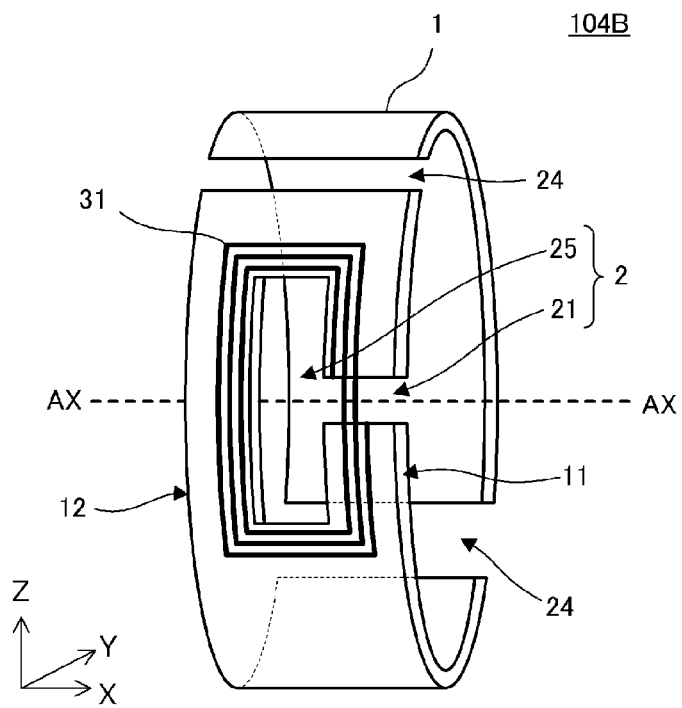
FIG. 9A is an outer appearance perspective view of an antenna device 104B according to the fourth preferred embodiment of the present invention.
Figure 9B:
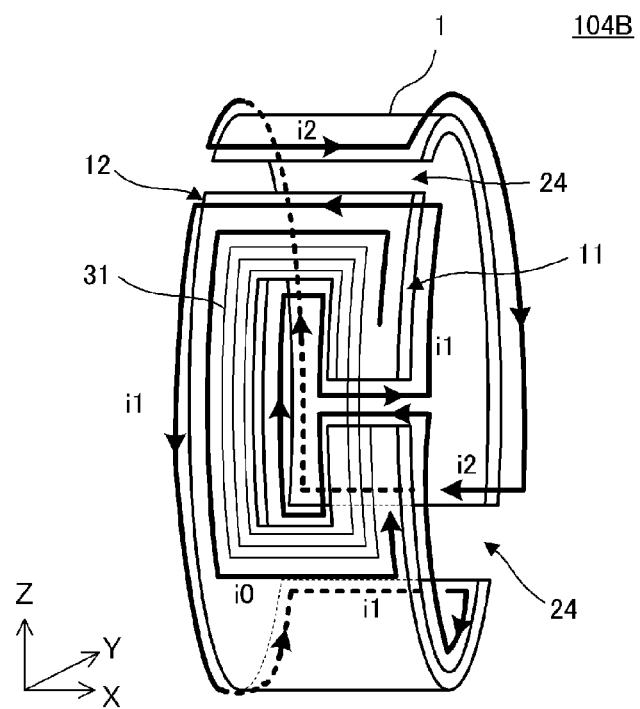
FIG. 9B is an outer appearance perspective view of the antenna device 104B, which illustrates a relationship between a current flowing through the power feed coil 31 and a current that is generated in the ring-shaped conductor 1.

FIG. 9A is an outer appearance perspective view of an antenna device 104B according to the fourth preferred embodiment, and FIG. 9B is an outer appearance perspective view of the antenna device 104B, which illustrates a relationship between a current flowing through the power feed coil 31 and currents that are generated in the ring-shaped conductor 1. FIG. 8A, FIG. 8B, FIG. 9A, and FIG. 9B illustrate the configurations of the antenna devices 104A and 104B in a simplified manner.

The antenna devices 104A and 104B in the fourth preferred embodiment are preferably different from the antenna device 101 in the first preferred embodiment in a point that they further include a slit portion(s) 24. Other configurations thereof are preferably the same or substantially the same as those of the antenna device 101 in the first preferred embodiment.

Hereinafter, elements of the antenna devices 104A and 104B, which are different from the antenna device 101 in the first preferred embodiment, will be described.

The ring-shaped conductor 1 of the antenna device 104A further preferably includes a cavity (slit portion 24) connecting the first edge end portion 11 and the second edge end portion 12 in addition to the cavity 2 generating electric field coupling, magnetic field coupling, and/or electromagnetic field coupling with the power feed coil 31, as illustrated in FIG. 8A.

Then, the relationship between the current flowing through the power feed coil 31 and the current that is generated in the ring-shaped conductor 1 will be described. As illustrated in FIG. 8B, when a current i0 flows through the power feed coil 31, the current i0 induces a current i1 by electric field coupling, magnetic field coupling, and/or electromagnetic field coupling in the wide portion 25 of the ring-shaped conductor 1. That is to say, the current i0 causes the current i1 in a direction of cancelling the current i0 (clockwise direction in FIG. 8B) to be generated in the wide portion 25 in a portion in which the power feed coil 31 and the ring-shaped conductor 1 are close to each other. In this case, a current density in the edge end of the wide portion 25 of the ring-shaped conductor 1 is high based on the edge effect. The wide portion 25 faces the first edge end portion 11 of the ring-shaped conductor 1 with the slit portion 21 interposed therebetween. Therefore, the current i1 induced in the wide portion 25 flows through the first edge end portion 11 after passing through the edge end of the slit portion 21 based on the edge effect (upper portion of the first edge end portion 11 in FIG. 8B).

The ring-shaped conductor 1 preferably includes the slit portion 24 connecting the first edge end portion 11 and the second edge end portion 12. Therefore, the current i1 flowing through the first edge end portion 11 flows through the second edge end portion after passing through the edge end of the slit portion 24. The current i1 flowing through the second edge end portion 12 flows through the first edge end portion 11 after passing through the edge end of the slit portion 24 (lower portion of the first edge end portion 11 in FIG. 8B). The current i1 flowing through the first edge end portion 11 flows through the wide portion 25 after passing through the slit portion 21.

As described above, the power feed coil 31 is coupled to the ring-shaped conductor 1 with an electric field, a magnetic field, or an electromagnetic field generated therebetween. Therefore, the ring-shaped conductor 1 defines and functions as a booster antenna of the power feed coil 31. With this function, a substantial coil opening defining and functioning as an antenna is larger than that when only the power feed coil 31 is provided. This enables coupling with a communication partner-side antenna coil to become easier.

The ring-shaped conductor 1 of the antenna device 104B preferably further include the two cavities (slit portions 24) connecting the first edge end portion 11 and the second edge end portion 12 in addition to the cavity 2 generating electric field coupling, magnetic field coupling, and/or electromagnetic field coupling with the power feed coil 31, as illustrated in FIG. 9A.

Then, the relationship between the current flowing through the power feed coil 31 and the currents that are generated in the ring-shaped conductor 1 will be described. As illustrated in FIG. 9B, when a current i0 flows through the power feed coil 31, the current i0 induces a current i1 by electric field coupling, magnetic field coupling, and/or electromagnetic field coupling in the wide portion 25 of the ring-shaped conductor 1. That is to say, the current i0 causes the current i1 in a direction of cancelling the current i0 (clockwise direction in FIG. 9B) to be generated in the wide portion 25 in a portion in which the power feed coil 31 and the ring-shaped conductor 1 are close to each other. In this case, a current density in the edge end of the wide portion 25 of the ring-shaped conductor 1 is high based on the edge effect. The wide portion 25 faces the first edge end portion 11 of the ring-shaped conductor 1 with the slit portion 21 interposed therebetween. Therefore, the current i1 induced in the wide portion 25 flows through the first edge end portion 11 after passing through the edge end of the slit portion 21 based on the edge effect.

The ring-shaped conductor 1 preferably includes the slit portions 24 connecting the first edge end portion 11 and the second edge end portion 12. Therefore, the current i1 flowing through the first edge end portion 11 flows through the second edge end portion after passing through the edge end of the slit portion 24 (slit portion 24 at the upper side in FIG. 9B). The current i1 flowing through the second edge end portion 12 flows through the first edge end portion 11 after passing through the edge end of the slit portion 24 (slit portion 24 at the lower side in FIG. 9B). The current i1 flowing through the first edge end portion 11 flows through the wide portion 25 after passing through the slit portion 21.

Furthermore, the current i1 flowing through the edge end of the slit portions 24 induces a current i2 by electric field coupling, magnetic field coupling, and/or electromagnetic field coupling in the ring-shaped conductor 1. That is to say, the current i2 in the direction of cancelling the current i1 is generated in portions that are electrically isolated by the slit portions 24 and in which portions of the ring-shaped conductor 1 are close to each other.

As described above, the power feed coil 31 is coupled to the ring-shaped conductor 1 with an electric field, a magnetic field, or an electromagnetic field generated therebetween. Therefore, the ring-shaped conductor 1 defines and functions as a booster antenna of the power feed coil 31. With this function, a substantial coil opening defining and functioning as an antenna is larger than that when only the power feed coil 31 is provided. This enables coupling with a communication partner-side antenna coil to become easier.

It should be noted that in the antenna devices 104A and 104B in the present preferred embodiment, the direction of the current i1 flowing through the first edge end portion 11 and the direction of the current i1 flowing through the second edge end portion 12 are reversed (see FIG. 8B, FIG. 9B, and the like). Therefore, in the same manner as the antenna device 103 in the third preferred embodiment, the magnetic fluxes φ3 and φ4 that pass through the first edge end portion 11 and the second edge end portion 12, respectively, of the ring-shaped conductor 1 from the cavity 25 are generated (see FIG. 7B). Accordingly, the configuration in which the cavity(ies) (slit portion(s)) 24 connecting the first edge end portion 11 and the second edge end portion 12 is(are) further included in addition to the cavity making electric field coupling, magnetic field coupling, and/or electromagnetic field coupling with the power feed coil 31 is able to provide the antenna devices 104A and 104B each with an antenna directivity that is different from the antenna device 101.

Furthermore, in the antenna devices 104A and 104B in the present preferred embodiment, the first edge end portion 11 and the second edge end portion 12 are not continuous in the circumferential direction with the configuration having the slit portion(s) 24. Therefore, the degree of freedom in design of the ring-shaped conductor 1 is enhanced, and eventually, the degree of freedom in design of a communication terminal apparatus including the antenna device 104A or 104B is also enhanced. Furthermore, the ring-shaped conductor can be used as a radiator of an antenna of another communication system of a UHF band and a SHF band, such as Bluetooth (registered trademark) and WiFi (registered trademark), because the ring-shaped conductor 1 is divided by the slit portion(s) 24.

Although the antenna device 104B in the present preferred embodiment preferably includes the two slit portions 24, as an example, the antenna device 104B is not limited to this configuration. The number of cavities (slit portions 24) connecting the first edge end portion 11 and the second edge end portion 12 can be appropriately changed.

Fifth Preferred Embodiment

Figure 10:
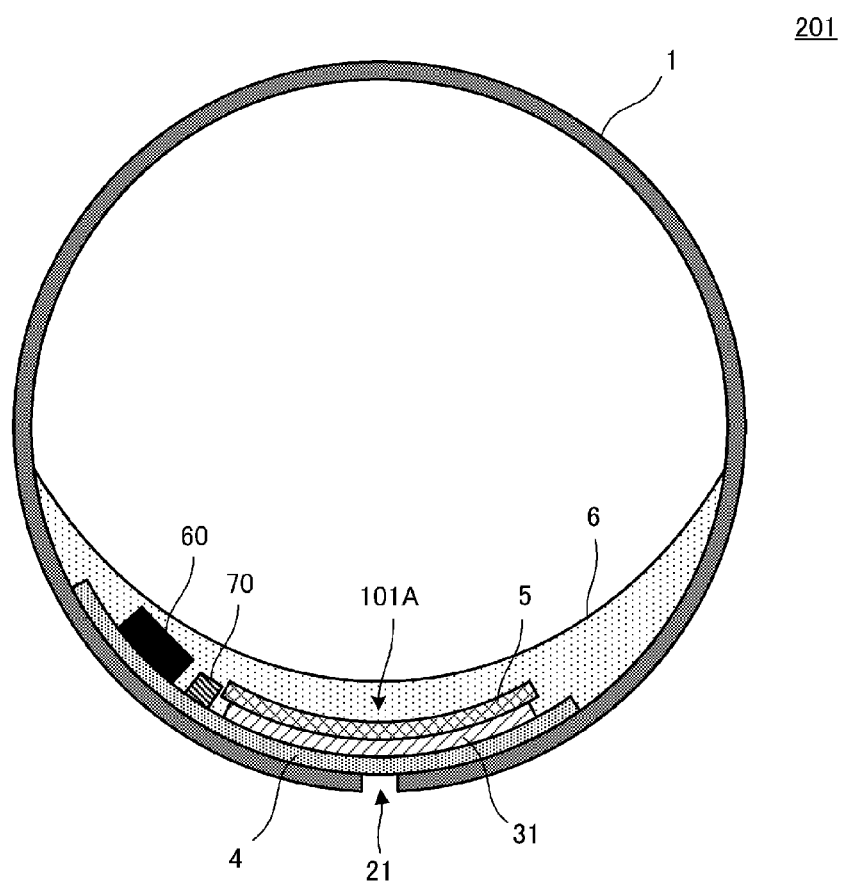
FIG. 10 is a cross-sectional view of a communication terminal apparatus 201 according to a fifth preferred embodiment of the present invention.

FIG. 10 is a cross-sectional view of a communication terminal apparatus 201 according to a fifth preferred embodiment of the present invention. FIG. 10 illustrates the configuration of the communication terminal apparatus 201 in a simplified manner.

The communication terminal apparatus 201 in the fifth preferred embodiment preferably includes the ring-shaped conductor 1, the power feed coil 31, a base material layer 4, a magnetic material layer 5, a radio frequency integrated circuit (RFIC) element 60, a chip capacitor 70, and a sealing resin 6.

The base material layer 4 preferably has a rectangular flat plate made of an insulating material such as resin and is bonded along an inner side surface of the ring-shaped conductor 1. That is to say, the base material layer 4 is curved along the inner side surface of the ring-shaped conductor 1. The base material layer 4 is made of, for example, a poly ethylene-terephthalate (PET) sheet.

The power feed coil 31 is preferably defined by a spiral-shaped conductor pattern that is provided on a main surface of a sheet made of resin such as polyimide (PI) and liquid crystal polymer (LCP). The power feed coil 31 is bonded along the main surface of the base material layer 4 (upper surface of the base material layer 4 in FIG. 10) at the opposite side to the main surface thereof that is bonded to the ring-shaped conductor 1. That is to say, the power feed coil 31 is curved along the inner side surface of the ring-shaped conductor 1.

The magnetic material layer 5 is bonded along one main surface of the power feed coil 31 (upper surface of the power feed coil 31 in FIG. 10). That is to say, the magnetic material layer 5 is curved along the main surface of the power feed coil 31. The magnetic material layer 5 is preferably made of, for example, a ceramic material layer such as magnetic ferrite ceramic or a ferrite powder-containing resin layer with magnetic ferrite powder dispersed in resin. It should be noted that a planar shape of the magnetic material layer 5 can be appropriately changed.

As described above, all of the base material layer 4, the power feed coil 31, and the magnetic material layer 5 are preferably arranged in an inner side portion of the ring-shaped conductor in the radial direction. The ring-shaped conductor 1, the power feed coil 31, the base material layer 4, and the magnetic material layer 5 define the antenna device 101A. The antenna device 101A is preferably different from the antenna device 101 in the first preferred embodiment in a point that the power feed coil 31 is in the inner side portion of the ring-shaped conductor 1 in the radial direction and the magnetic material layer 5 is further included.

The communication terminal apparatus 201 in the present preferred embodiment is an arm ring-type information terminal that is attached to a wrist and the above-described antenna device 101A is provided in a ring portion of an arm ring (not illustrated). That is to say, the antenna device 101A is provided in an attachment portion through which a portion of the human body is inserted.

The RFIC element 60 and the chip capacitor 70 are mounted on the main surface of the base material layer 4 (upper surface of the base material layer 4 in FIG. 10) at the opposite side to the main surface thereof that is bonded to the ring-shaped conductor 1. The RFIC element 60 is connected to both of end portions of the power feed coil 31 and the chip capacitor 70 is connected in parallel with the power feed coil 31. Capacitance components of the power feed coil 31, the chip capacitor 70, and the RFIC element 60 define a LC resonance circuit. The capacitance of the chip capacitor 70 is selected such that a resonant frequency of the LC resonance circuit is a frequency (for example, 13.56 MHz) which is equal or substantially equal to a communication frequency of an RFID system. A plurality of capacitors that set the resonant frequency may be provided.

It should be noted that the RFIC element 60 may be an RFIC chip itself or may be an RFIC package formed by integrating a matching circuit and the like with the RFIC chip.

The RFIC element 60 includes, for example, a high-frequency radio IC chip of a HF band for a HF-band RFID system. By making the communication terminal apparatus 201 (that is, an RFID tag) close to a reader/writer device, the ring-shaped conductor 1 (booster antenna) of the communication terminal apparatus 201 and an antenna coil of the reader/writer device of an RFID make magnetic field coupling with each other. With this coupling, RFID communication is generated between the RFID tag and the reader/writer device.

All portions of the sealing resin 6 are provided in an inner side portion of the ring-shaped conductor in the radial direction. As illustrated in FIG. 10, the ring-shaped conductor 1, the power feed coil 31, the base material layer 4, the magnetic material layer 5, the RFIC element 60, and the chip capacitor 70 are preferably embedded in the sealing resin 6. The sealing resin 6 protects the RFIC element 60, the chip capacitor 70, the power feed coil 31, and the like from impact, external force, and the like that are applied from the outside. Inclusion of the sealing resin 6 enhances reliability of electric connection to the RFIC element 60, the chip capacitor 70, and the power feed coil 31, thus increasing mechanical strength of the communication terminal apparatus 201. It should be noted that the sealing resin 6 is not limited to the configuration in the preferred embodiment. The number, shape, size, and the like of the sealing resin 6 can be appropriately changed.

With this configuration, the communication terminal apparatus including the antenna device, which is used for a communication system of a HF band and a UHF band, is able to be provided.

Moreover, the antenna device 101A preferably further includes the magnetic material layer 5. An action of the magnetic material layer 5 having high magnetic permeability therefore enables the power feed coil 31 to provide a predetermined inductance with a conductor pattern having the small number of turns. In addition, a magnetism collection effect of the magnetic material layer 5 enhances magnetic field coupling with a communication partner-side antenna coil. Furthermore, the configuration including the magnetic material layer 5 also provides a magnetism shield effect at the back surface side.

Furthermore, the antenna device 101A is provided in the attachment portion through which a portion of a human body is inserted. Therefore, as described in the first preferred embodiment, radiation and collection of the magnetic flux are performed efficiently. Accordingly, the magnetic field coupling with the communication partner-side antenna coil is improved. As a result, excellent communication characteristics are provided.

The power feed coil 31 is not limited to be arranged in an inner side portion of the ring-shaped conductor 1 in the radial direction as described in the present preferred embodiment. The power feed coil 31 may be arranged in an outer side portion of the ring-shaped conductor 1 in the radial direction.

Although in the present preferred embodiment, the base material layer 4, the magnetic material layer 5, the RFIC element 60, the chip capacitor 70, and the sealing resin 6 are arranged in the inner side portion of the ring-shaped conductor 1 in the radial direction, as an example, the arrangement positions thereof are not limited to this configuration. The base material layer 4, the magnetic material layer 5, the RFIC element 60, the chip capacitor 70, and the sealing resin 6 may be arranged in the outer side portion of the ring-shaped conductor 1 in the radial direction as described in the above-described preferred embodiment.

Sixth Preferred Embodiment

Figure 12:
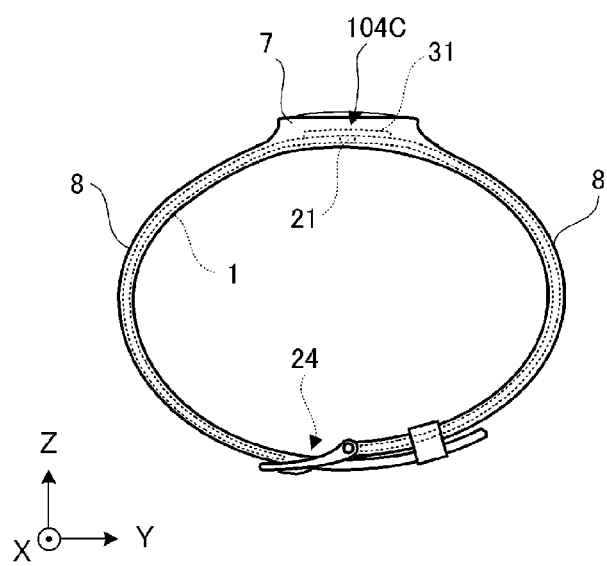
FIG. 12 is a view illustrating a state in which the communication terminal apparatus 202 is attached to a wrist.

FIG. 11A is a plan view of a communication terminal apparatus 202 according to a sixth preferred embodiment of the present invention, and FIG. 11B is a right side view of the communication terminal apparatus 202. FIG. 12 is a view illustrating a state in which the communication terminal apparatus 202 is attached to a wrist. It should be noted that in FIG. 12, the wrist is omitted.

The communication terminal apparatus 202 preferably includes a main body portion 7, a belt portion 8, the ring-shaped conductor 1, and the power feed coil 31. The communication terminal apparatus 202 in the present preferred embodiment is a wrist band-type information terminal.

The ring-shaped conductor 1 is a flat plate having a rectangular planar shape with round corners and is provided in the belt portion 8. The ring-shaped conductor 1 is curved about an axis in a state in which the communication terminal apparatus 202 is attached to the wrist, as illustrated in FIG. 12. That is to say, the ring-shaped conductor 1 in the present preferred embodiment is a conductor having flexibility.

The power feed coil 31 is bonded along one main surface (left surface in FIG. 11B) of the ring-shaped conductor 1 and is accommodated in the main body portion 7. Therefore, the power feed coil 31 is arranged in an outer side portion (upper side in FIG. 12) of the ring-shaped conductor 1 in the radial direction in a state in which the communication terminal apparatus 202 is attached to the wrist. It should be noted that both of end portions of the power feed coil 31 are connected to a power feed circuit (not illustrated).

The ring-shaped conductor 1 and the power feed coil 31 define an antenna device 104C. The antenna device 104C is preferably different from the antenna device 104A in the fourth preferred embodiment in a shape of the ring-shaped conductor 1 and in a point that the ring-shaped conductor 1 is defined by the conductor having flexibility.

As described above, the communication terminal apparatus 202 in the present preferred embodiment is the wrist band-type information terminal that is attached to the wrist and the antenna device 104C is provided in the main body portion 7 and the belt portion 8 of the wrist band. That is to say, the antenna device 104C is provided in an attachment portion through which a portion of a human body is inserted.

With this configuration, in the same manner as the communication terminal apparatus 201 in the fifth preferred embodiment, the communication terminal apparatus including the antenna device, which is used for a communication system of a HF band and a UHF band, is able to be provided.

Furthermore, the antenna device 104C is provided in the attachment portion through which a portion of the human body is inserted, thus enhancing magnetic field coupling with a communication partner-side antenna coil. As a result, excellent communication characteristics are achieved.

The "attachment portion" indicates the configuration that is attached to the human body when used and also includes a wrist band and the like, which do not always keep a usage state as in the present preferred embodiment. That is to say, the state in which the ring-shaped conductor 1 is curved is not limited to a state in which the ring-shaped conductor 1 is always curved about the axis and also includes a mode in which the ring-shaped conductor 1 is curved and a portion of the human body is inserted therethrough when used.

Other Preferred Embodiments

Although the power feed coil 31 is provided as a spiral-shaped conductor pattern, as an example, in the above-described preferred embodiments, the power feed coil 31 is not limited to such a configuration. The configuration of the power feed coil 31 is able to be appropriately changed and the power feed coil 31 may be a helical-shaped coil, for example.

Although the ring-shaped conductor 1 preferably includes the first edge end portion 11 and the second edge end portion 12 that are perpendicular or substantially perpendicular to the axial direction (X direction in FIG. 2A), as an example, in the above-described preferred embodiments, the ring-shaped conductor 1 is not limited to this configuration. The first edge end portion 11 and the second edge end portion 12 may not be perpendicular to the axial direction (X direction in FIG. 2A) and may be curved with a component in the axial direction (X direction in FIG. 2A).

Although the ring-shaped conductor 1 preferably is curved in a substantially circular shape when seen from the axial direction, as an example, in the above-described preferred embodiments, the ring-shaped conductor 1 is not limited to this configuration. The shape of the ring-shaped conductor 1 that is curved about the axis can be appropriately changed to an elliptical shape, a polygonal shape, or the like when seen from the axial direction. It is sufficient that the ring-shaped conductor is about the axis as a whole. When the ring-shaped conductor includes a plurality of conductors, all of the conductors of the ring-shaped conductor are not limited to curved forms and a portion or all of the conductors of the ring-shaped conductor may be provided in a planar form. The ring-shaped conductor may be defined by a slit portion connecting a first edge end portion and a second edge end portion and conductors with planar forms. When the ring-shaped conductor includes a plurality of conductors, the respective conductors of the ring-shaped conductor may be provided in a tiled pattern or a mosaic pattern.

Although the cross-section configuration of the ring-shaped conductor 1, which is perpendicular or substantially perpendicular to the circumferential direction, preferably is substantially rectangular, as an example, in the above-described preferred embodiments, the ring-shaped conductor 1 is not limited to this configuration. The cross-section configuration of the ring-shaped conductor 1, which is perpendicular or substantially perpendicular to the circumferential direction, can be appropriately changed to an elliptical shape, a polygonal shape, a semi-cylindrical shape, or the like. In the same manner, the thickness of the ring-shaped conductor 1 in the radial direction can be appropriately changed. That is to say, the ring-shaped conductor 1 may have the configuration having a predetermined thickness or may be a thin conductor such as, for example, a metal foil.

Moreover, the width of the ring-shaped conductor 1 in the axial direction (X direction in FIG. 2A) can also be appropriately changed in a range of providing an effect that the ring-shaped conductor 1 defines and functions as the booster antenna of the power feed coil 31.

Although the communication terminal apparatus including the attachment portion through which a portion of the human body is inserted is the ring, the arm ring, or the wrist band, as an example, in the above-described preferred embodiments, the communication terminal apparatus is not limited thereto. The communication terminal apparatus including the above-described attachment portion may be, for example, a wristwatch, a bracelet, an earring, a pierced earring, a choker, or the like.

It should be noted that the attachment portion is not limited to have the configuration through which a portion of the human body is inserted. That is to say, the communication terminal apparatus may be a collar worn by a pet or livestock, for example.

Although the antenna device and the electronic apparatus in the communication system mainly utilizing magnetic field coupling such as NFC have been described in the above-described preferred embodiments, the antenna device and the electronic apparatus in the above-described preferred embodiments can be used in a non-contact power transmission system (of an electromagnetic induction type or a magnetic field resonance type) utilizing magnetic field coupling in the same manner. The antenna device in the above-described preferred embodiments can be applied as a power reception antenna device of a power reception device in the non-contact power transmission system of the magnetic field resonance type, which is used at a frequency of, for example, the HF band (in particular, about 6.78 MHz or about 6.78 MHz). Also in this case, the power feed coil (power reception coil) and the ring-shaped conductor define and function as the power reception antenna device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a power feed coil; and
a ring-shaped electrical conductor arranged about an axis and including a first edge end portion and a second edge end portion in an axial direction; wherein
the ring-shaped electrical conductor includes a cavity inward from the first edge end portion;
at least a portion of the cavity overlaps with a coil opening of the power feed coil when seen from a radial direction; and
the power feed coil generates electric field coupling, magnetic field coupling, and/or electromagnetic field coupling with the cavity of the ring-shaped electrical conductor.

2. The antenna device according to claim 1, wherein
the cavity includes a wide portion with a relatively larger width than other portions of the cavity in a circumferential direction at a position that is not adjacent to the first edge end portion or the second edge end portion; and
the power feed coil generates electric field coupling, magnetic field coupling, and/or electromagnetic field coupling with the wide portion.

3. The antenna device according to claim 1, wherein the cavity connects the first edge end portion and the second edge end portion.

4. The antenna device according to claim 1, further comprising an additional cavity connecting the first edge end portion and the second edge end portion in addition to the cavity generating electric field coupling, magnetic field coupling, and/or electromagnetic field coupling with the power feed coil.

5. The antenna device according to claim 1, wherein the second edge end portion of the ring-shaped electrical conductor is continuous in a circumferential direction.

6. A communication terminal apparatus comprising:
the antenna device according to claim 1; and
a power feed circuit that is connected to the power feed coil or generates electric field coupling, magnetic field coupling, and/or electromagnetic field coupling with the power feed coil.

7. The communication terminal apparatus according to claim 6, wherein the ring-shaped electrical conductor is provided in an attachment portion through which a portion of a human body is insertable.

8. The antenna device according to claim 1, wherein the cavity has a single constant width.

9. The antenna device according to claim 8, wherein the second edge end portion of the ring-shaped electrical conductor is continuous in a circumferential direction.

10. The antenna device according to claim 3, wherein
the cavity includes a wide portion with a relatively larger width than other portions of the cavity in a circumferential direction at a position that is not adjacent to the first edge end portion or the second edge end portion; and
the power feed coil generates electric field coupling, magnetic field coupling, and/or electromagnetic field coupling with the wide portion.

11. The antenna device according to claim 4, further comprising a plurality of the additional cavities connecting the first edge end portion and the second edge end portion.

12. The antenna device according to claim 2, wherein the cavity connects the first edge end portion and the second edge end portion.

13. The antenna device according to claim 12, further comprising an additional cavity connecting the first edge end portion and the second edge end portion in addition to the cavity making electric field coupling, magnetic field coupling, and/or electromagnetic field coupling with the power feed coil.

14. The antenna device according to claim 4, further comprising a plurality of the additional cavities connecting the first edge end portion and the second edge end portion.

15. A communication terminal apparatus comprising:

the antenna device according to claim 2; and a power feed circuit that is connected to the power feed coil or generates electric field coupling, magnetic field coupling, and/or electromagnetic field coupling with the power feed coil.

16. A communication terminal apparatus comprising:

the antenna device according to claim 3; and a power feed circuit that is connected to the power feed coil or generates electric field coupling, magnetic field coupling, and/or electromagnetic field coupling with the power feed coil.

17. A communication terminal apparatus comprising:

the antenna device according to claim 4; and a power feed circuit that is connected to the power feed coil or generates electric field coupling, magnetic field coupling, and/or electromagnetic field coupling with the power feed coil.

18. A communication terminal apparatus comprising:

the antenna device according to claim 5; and a power feed circuit that is connected to the power feed coil or generates electric field coupling, magnetic field coupling, and/or electromagnetic field coupling with the power feed coil.

19. A communication terminal apparatus comprising:

the antenna device according to claim 8; and a power feed circuit that is connected to the power feed coil or generates electric field coupling, magnetic field coupling, and/or electromagnetic field coupling with the power feed coil.

20. A communication terminal apparatus comprising:

the antenna device according to claim 11; and a power feed circuit that is connected to the power feed coil or generates electric field coupling, magnetic field coupling, and/or electromagnetic field coupling with the power feed coil.

\* \* \* \* \*